Jan. 18, 1955   R. B. GRAY   2,699,795
DYNAMICALLY DAMPED FLUID RELAY
Filed Aug. 5, 1949   2 Sheets-Sheet 1
*Fig. 1*
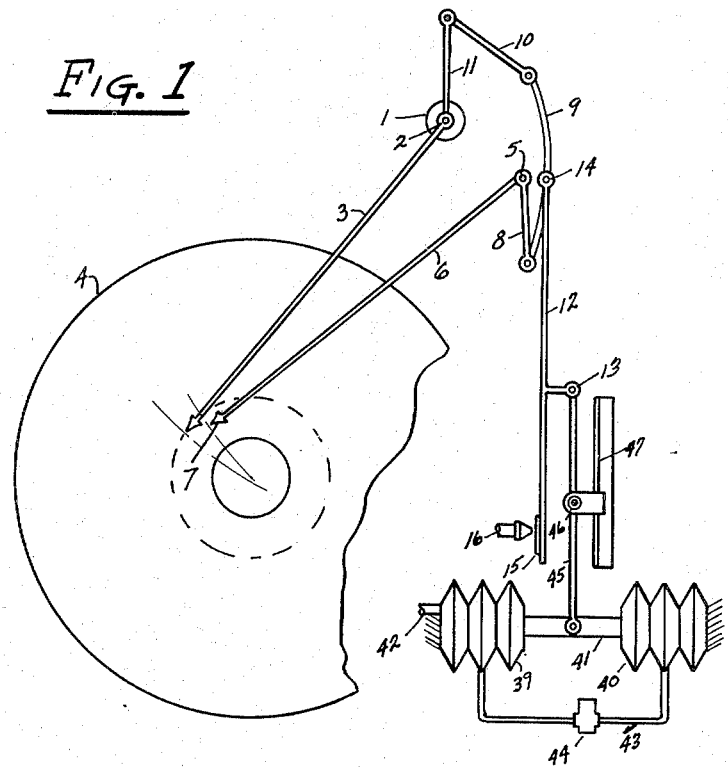
*Fig. 3*
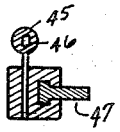
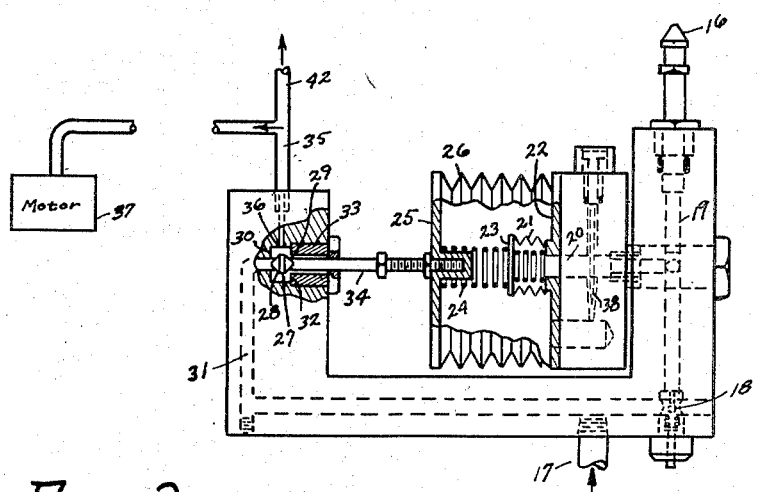
*Fig. 2*
Inventor
Robert B Gray
By
Ralph Hammer
Attorney Jan. 18, 1955   R. B. GRAY   2,699,795
DYNAMICALLY DAMPED FLUID RELAY
Filed Aug. 5, 1949   2 Sheets-Sheet 2

Inventor
Robert B Gray
Ralph Hammar
Attorney

United States Patent Office 2,699,795
Patented Jan. 18, 1955

2,699,795

DYNAMICALLY DAMPED FLUID RELAY

Robert B. Gray, Erie, Pa., assignor to American Meter Company, Erie, Pa., a corporation of Delaware Application August 5, 1949, Serial No. 108,775

8 Claims. (Cl. 137—86)

In fluid operated controllers producing a control pressure corresponding to the quantity to be measured or controlled, there is a tendency to hunting which increases as the sensitivity of the controllers is increased. This invention is intended to dynamically damp the control pressure so as to prevent hunting. Further objects and advantages appear in the specification and claims.

Figure 4:
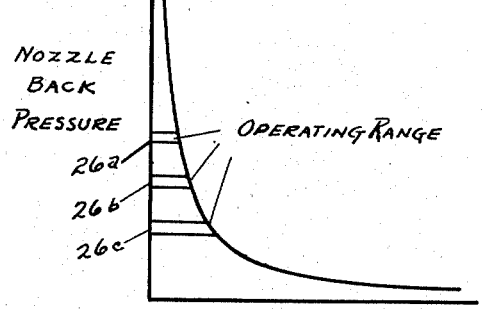
Figure 7:
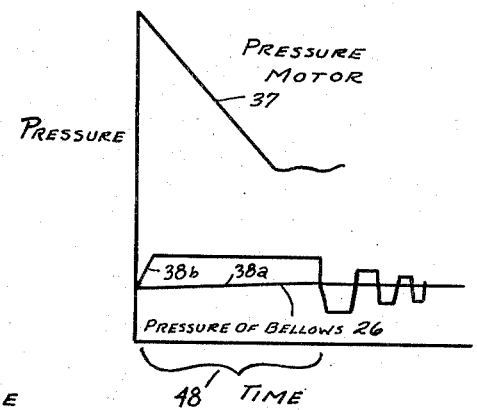
Figure 5:
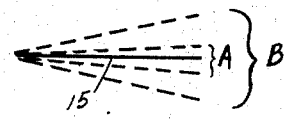
Figure 6:
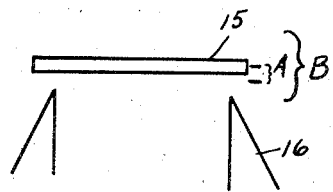
Figure 8:
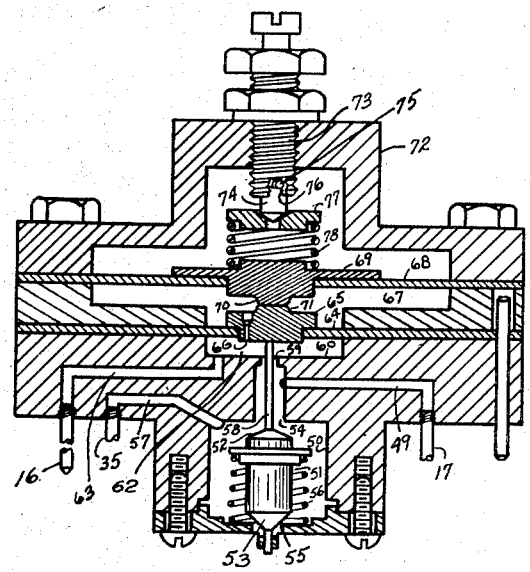

In the drawings, Fig. 1 is a diagrammatic view of a controller, Fig. 2 is an enlarged section through the pressure control, Fig. 3 is a detail of the throttling range adjustment, Fig. 4 is a diagram of nozzle pressure, Fig. 5 is a diagram of the control ranges of the bellows, Fig. 6 is an enlarged view showing the nozzle and flapper position for the control ranges, Fig. 7 is a diagram illustrating the operation of the control, and Fig. 8 is a section through a modification of the pressure control.

Referring to the drawings, 1 indicates a sensitive measuring element for the controlled quantity and having a shaft 2 carrying a pen arm 3 for a chart 4. At the same radial distance from the center of the chart as the measuring element is a fixed pivot 5 carrying a bell crank reset lever 6, one arm 7 of which serves as a direct set pointer indicating the desired value of the controlled quantity and the other arm 8 of which is pivoted to one end of a differential lever 9. The opposite end of the differential lever is connected by a link 10 to an arm 11 on the shaft 2. In the balanced position the direct set pointer 7 indicates the same value as the pen arm 3 and the differential lever is parallel to the arm 11 and in line through the pivot 5 so the arm 11, link 10, and differential lever 9 for this position form a parallelogram linkage. The parts are illustrated in an exaggerated off-balance position.

Changes in the value of the controlled quantity are indicated by rotation of the shaft 2 and of the pointer 3 and arm 11 fixed thereto. The movement of the arm 11 is transmitted to the differential lever 9 causing it to pivot about the lower end of the arm 8. The motion of the differential lever is transmitted to a flapper lever 12 pivoted on a pivot 13 and having one end pivoted at 14 to the differential lever 9 and its other end carrying a flapper 15 cooperating with a nozzle 16 supplied from a pneumatic fluid pressure line 17 through a restricted orifice 18 and a passageway 19. The pressure in the passageway 19 varies directly with the position of the flapper, increasing as the flapper approaches and decreasing as the flapper recedes from the nozzle. The orifice 18 so restricts the flow that the variations in pressure in the passageway 19 do not materially vary the quantity of fluid flow.

The pressure in passageway 19 is fed through a way 20 to the interior of a bellows 21 carried by a rigid wall 22 and loaded by a compression spring 23. The bellows 21 acts through a relatively light coupling spring 24 attached to the free end plate 25 of an enclosing bellows 26 also carried by the rigid wall 22. The end plate 25 carries a valve 27 having oppositely facing conical faces 28 and 29 respectively cooperating with a seat 30 in a way 31 leading from the fluid pressure supply 17 and with a seat 32 on a bushing 33 loosely surrounding the valve stem 34. The valve 27 floats between the valve seats 30 and 32 and thereby controls the pressure in a line 35 leading from a chamber 36 around the valve seats to a fluid motor 37 which operates a control member. The travel of the valve 27, which is of the order of .005", is exaggerated on the drawing.

Upon changes in pressure in the passageway 19, due to changes in the magnitude of the controlled quantity, the bellows 21 initially moves the valve 27 in the direction to produce a change in the pressure in the line 35 in the direction to cause operation of the motor 37 to bring the controlled quantity back to the desired value. For example, upon an increase in the magnitude of the controlled quantity, the motor 37 would actuate a control member in the direction to decrease the magnitude of the controlled quantity. In other words, the bellows 21 acts initially to produce a change in pressure in the line 35 in the direction to compensate for variations in the controlled quantity.

The bellows 26, which is larger and more sensitive than the bellows 21, is fed from the way 20 through a needle valve 38 which introduces an adjustable time lag between the response of the bellows 26. That is, the initial compensating action of the bellows 21 is followed up by a delayed compensating action of the bellows 26. The bellows or diaphragms 21 and 26 comprise a control pressure relay valve. The sensitivity of the relay is adjustable by the needle valve 38 which permits matching of the time lag or sensitivity of the relay to the system.

Under steady state conditions, the valve 27 holds a fixed pressure in the line 35 which corresponds to the pressure of the passageway 19 (i. e. the nozzle pressure) determined by the flapper 15. That is, the pressure of the passageway 19 is uniformly acting on the bellows 21 and 26; the bellows 21 is balanced and the bellows 26 is flexed to a position corresponding to the nozzle pressure. The nozzle pressure, for any selected operating range such as 26a, 26b, or 26c shown on Fig. 4, is determined by a variation in the flapper position with respect to the nozzle measured in microns. That is, variation in nozzle pressure corresponding to full scale on the chart is effected by varying the separation of the flapper and nozzle .0005" or less. This means that for any setting of an operating point by direct set pointer 7, the flapper 15 under steady state conditions has a negligible variation in separation from the nozzle although the steady state flapper position does, of course, vary with the operating point and does correspond to the operating point. The mechanical linkage for producing the small variation in flapper position under steady state conditions results from the fact that under steady state conditions the differential lever 9 is in line with the fixed pivot 5 and the motion of the differential lever transmitted to the flapper is due to the angular motion of the differential lever about the fixed pivot 5. When the pivot 14 is close to the pivot 5, a large variation in the angularity of the differential lever results in a small variation in flapper position.

While the flapper position is essentially or almost constant under steady state conditions, there is a substantial variation in flapper position under transient conditions. Movement of the pen arm 3 away from the position set by the direct set pointer 7 causes movement of the differential lever 9 to one side of the fixed pivot 5, thus producing a much larger change in nozzle pressure than the full range of steady state nozzle pressures. This greater change in nozzle pressure can be explained as due to the difference between pivoting the differential lever 9 about the pivot 5 and about the lower end of the arm 8: pivoting about the lower end of the arm 8 obviously results in the greater change in flapper position and resultant nozzle pressure. This means that a sudden small movement of the pen arm 3 from the desired position indicated by the direct set pointer 7 results in a large transient change in nozzle pressure.

Upon a transient change in nozzle pressure the pressure in the bellows 26 suddenly change due to the needle valve 38 which limits the rate of change in pressure in the bellows 26 as indicated at 38a in Fig. 7. The transient change in nozzle pressure is, however, rapidly effected on the bellows 21 as indicated at 38b in Fig. 7 and causes a rapid movement of the bellows 21 which is transmitted through the coupling spring 24 to the valve 27 and if the change in nozzle pressure is great enough, as would be the case for large excursions of the pen arm 3 from the desired position of the direct set pointer 7, can cause movement of the valve to the full limit of its travel, thereby securing the rapid rate of change of the motor pressure in line 35 in the direction to restore the controlled quantity to the desired value indicated by the direct set pointer 7. The effect of the change in motor pressure in line 35 is fed back to the flapper 15 in two ways: (1) by the throttling bellows 39 which moves the flapper in the reverse direction from its initial transient movement, and (2) by the change in the indication of the sensitive measuring element 1 which reflects, or indicates, the compensating action resulting from the change in motor pressure. The throttling bellows 39 is supplied by a line 42 branching from the motor pressure line 35. The action of the throttling bellows is opposed by a reset bellows 40 connected to the throttling bellows by a rod 41 and supplied from the throttling bellows through a line 43 having an adjustable restriction 44 which introduces a time lag in the equalizing of the pressure in the throttling and reset bellows. A change in pressure in the throttling bellows causes a movement of a lever 45 about an adjustable pivot 46 slidable on the lever 45 and on a stationary guide 47. When the pivot is fixed at the upper end of the lever 45 the throttling bellows has no effect. When the pivot is fixed or adjusted at some intermediate point on the lever 45 the change in motor pressure transmitted to the throttling bellows 39 causes an initial movement of the flapper 15 in the sense to oppose the movement of the flapper by the differential lever 9. This action of the throttling bellows is only present during transient changes. As the pressure in the throttling and reset bellows equalizes through the restriction 44 the flapper is returned to the position determined by the differential lever 9. Under very slow changes the pressure in the throttling and reset bellows is at all times equalized and there is no compensating action introduced by the throttling bellows.

There is a time lag between the initiation of the transient movement of the flapper 15 and the feed back to the flapper described above. In Fig. 7 this time interval is indicated at 48. During this time interval there has been a gradual change in pressure in the bellows 26 and a corresponding change in pressure in the bellows 21. Upon the feed back to the flapper which causes a reverse movement, there is a change in the opposite sense to the first transient change, but this change is of smaller magnitude due to the time delay introduced by the needle valve 38. The effect of this change due to feed back, and of subsequent changes, is shown in Fig. 7 by the successive oscillations in pressure in the bellows 21 and 26, each oscillation being of smaller amplitude and shorter duration until the final steady state condition is reached. From one aspect the oscillating energy is dissipated by the surging through the needle valve 38. Fig. 7 also shows the motor pressure in line 35 which changes at the maximum rate during the time interval indicated at 48, slightly overshooting the desired final value which is approached by a series of oscillations corresponding to the oscillations in bellows pressure.

Figs. 5 and 6 diagrammatically illustrate the order of magnitude of the change in flapper position under transient and steady state conditions. Under steady state conditions the flapper moves through a range indicated at A which is exaggerated for the purpose of illustration. The width of this range will ordinarily be of the order of a few hundred microns. Under transient conditions the flapper moves through a range indicated by B which may be of the order of a quarter of an inch. The transient movement of the flapper 15 produces the large variation in nozzle pressure necessary to secure the movement of the valve 27 through the small bellows 21. The movement of the flapper under steady state conditions produces the small variations in nozzle pressure necessary to move the large bellows 26 to the position corresponding to the desired position of the valve 27.

In Fig. 8 is shown a modification of the control pressure relay for use in the system shown in Fig. 1. The pressure supply 17 is connected to a way 49 leading to a chamber 50 containing a valve 51 having oppositely facing conical faces 52 and 53 respectively cooperating with a seat 54 controlling the flow of pressure from the way 49, and a seat 55 exhausting to atmosphere. The valve is normally biased by a compression spring 56 against the seat 54. Under operating conditions the valve floats in a position intermediate the seats 54 and 55 and thereby produces a control pressure in a way 57 leading to the conduit 35. The valve has a stem 58 extending through a slightly larger passageway 59 into a chamber 62. The clearance between the stem 58 and the walls of the passageway 59 is small and thereby provides a reduced pressure in the chamber 62 equivalent to that produced by the orifice 18 in the Fig. 2 control pressure relay. Since there is a continual back-and-forth or oscillating movement of the stem 58 in the passageway 59 the tendency to clogging of the passageway is substantially eliminated. From one aspect the stem 58 and the passageway 59 provide a self-cleaning pressure reducing orifice supplying the chamber 62. A way 63 leading from the chamber 62 conducts this reduced pressure to the nozzle 16. As in the previously described control pressure relay the pressure in the chamber 62 is controlled by the position of the flapper 15 with respect to the nozzle 16. The pressure within the chamber 62 acts on an impervious diaphragm 64 which may be made of rubber. Bonded to the rubber at the center is a metal plug 65, the lower end of which contacts the upper end of the valve stem 58. Extending through the plug 65 is a fine hole 66 which provides a restricted flow of pressure from the chamber 62 into a larger chamber 67 across the top of which is a larger diaphragm 68 having a metal plug 69 bonded at its center. The underside of the plug 69 has a projection 70 which abuts a similar projection 71 on the upper side of the plug 65. The upper side of the diaphragm 68 is closed by a cover 72 carrying an adjusting screw 73. The screw 73 is hollow and slidably carries therein a pin 74 which is free to move downward but has its upward movement restricted by a pin 75 extending through the pin 74 and received in slots 76 in the adjusting screw. The lower end of the pin 74 bears on a cap 77 at the upper end of a compression spring 78. The spring 78 normally holds the plugs 69 and 65 in engagement and against the upper end of the valve stem 58. The amount of force exerted by the spring 78 is adjusted by the screw 73. Under some conditions it is desirable that the valve completely shut off the exhaust so that the output pressure fed to the conduit 35 can be manually controlled by varying the supply pressure at the conduit 17. This is accomplished by pushing the adjusting screw 74 downward until the pin 75 is clear of the slots 76 and then turning the adjusting screw through a quarter turn. This sufficiently increases the compression of the spring 78 that the valve is held shut against the exhaust seat 55. This change is effected without changing the adjustment of the adjusting screw 73.

Under steady state conditions where the flapper 15 occupies a fixed position relative to the nozzle 16, the pressure in the chambers 62 and 67 equalizes through the fine hole 66 and the position of the valve 51 is determined by the force exerted by the nozzle pressure on the diaphragm 68. Under transient conditions when the nozzle pressure is subject to wide variations due to the changes in position of the flapper 15, the pressure in the chamber 62 is substantially instantaneously responsive to the change in the nozzle pressure while the pressure in the chamber 67 lags behind the nozzle pressure. Under transient conditions the small diaphragm 64 is at first fully effective to change the position of the valve 51 and thereby start to alter the outlet or control pressure in accordance with the change in the nozzle pressure. Of course, as the pressure in the chambers 62 and 67 equalize through the fine hole 66, the large diaphragm 68 comes progressively into play. If the change in nozzle pressure is in the direction to increase the pressure in the chamber 62 the small diaphragm 64 moves upward with the large diaphragm 68. If the change in nozzle pressure is in the direction to decrease pressure in the chamber 62 and the decrease is large enough, the small diaphragm may actually move away from the large diaphragm. Having the small diaphragm free to move away from the large diaphragm permits a quicker response which is advantageous in following transient conditions.

It is not necessary that the small diaphragm 64 be of impervious material. If the small diaphragm is of a pervious material such as leather the fine hole 66 can be omitted and the permeability of the leather relied upon to provide the gradual equalization of the pressure between the chambers 62 and 67. The use of an impervious diaphragm with the fine hole to control the equalization of pressure is preferred since the pores of a pervious material such as leather tend to clog with dirt.

The control pressure relay shown in Fig. 8 continues the feature of the Fig. 2 relay of having a quick acting, less sensitive diaphragm supplemented by a slow acting, more sensitive diaphragm to control the position of the valve. The sensitivity of the diaphragm can be expressed as a ratio of the change in output pressure to the change in nozzle pressure. The large diaphragm (exemplified in the Fig. 2 relay by the bellows 26) ordinarily will have a sensitivity as measured by the ratio of change in control pressure to change in nozzle pressure of from 10 to 20 times the sensitivity of the small diaphragm.

What I claim as new is:

1. A relay valve for use with a controller of the type in which the control impulse is derived from variations in pressure of a nozzle discharging against a cooperating surface, comprising a control pressure relay valve of the bleed type to amplify the nozzle pressure, said relay comprising a sensitive fluid pressure responsive element for positioning the relay valve in accordance with the nozzle pressure, retarded transfer means for transmitting the nozzle pressure to the sensitive element introducing a time lag in the response of such element, and a less sensitive fluid pressure responsive element acting in the same direction as the first element and directly responsive to the difference between the nozzle pressure and the pressure in the first element for positioning the control pressure relay valve in accordance with such difference in pressure, and force transmitting connections from the fluid pressure elements to the relay valve.

2. In a fluid pressure operated control system of the type having means responsive to a controlled quantity producing a pressure modulated in accordance with variations in the controlled quantity, and a bleed type relay valve for amplifying the modulated pressure to produce a control pressure for the controlled quantity, said relay having pressure supply, bleeder and control pressure passages and an element positionable to control the distribution of pressure between the bleeder and control pressure passages, said relay comprising an actuator connected to the element including a diaphragm fed from the modulated pressure through a high resistance path and a smaller diaphragm fed from the modulated pressure through a low resistance path, said diaphragms acting in the same direction, and a spring coupling between the diaphragms.

3. In a fluid pressure operated control system of the type having means responsive to a controlled quantity producing a pressure modulated in accordance with variations in the controlled quantity and a bleed type relay valve for producing a control pressure for the controlled quantity, said relay having pressure supply, bleeder and control pressure passages and an element positionable to control the distribution of pressure between the bleeder and control pressure passages, the combination of an actuator connected to the element including a diaphragm fed from the modulated pressure through a high resistance path and a smaller diaphragm fed from the modulated pressure through a low resistance path, said diaphragms acting in the same direction, and pressure transmitting abutments between the diaphragms, said abutments being free to move apart.

4. In a fluid pressure operated control of the type having a nozzle discharging against a cooperating surface, and means including a sensitive element responsive to a controlled quantity for controlling the separation of nozzle and surface and producing corresponding variations in nozzle pressure, the combination of a control pressure relay valve for amplifying the nozzle pressure, said relay comprising a sensitive fluid pressure responsive element connected through a retarded transfer means to the nozzle pressure positioning the relay valve in accordance with the steady state relative positions of the nozzle and surface, and a less sensitive fluid pressure responsive element directly responsive to the difference between the nozzle pressure and the pressure in the first element positioning the relay valve in accordance with the transient relative positions of the nozzle and surface and force transmitting connections from the pressure responsive elements to the relay valve, said fluide pressure elements acting in the same direction and supplementing each other.

5. In a fluid pressure operated control of the type having, a nozzle and cooperating surface controlling the nozzle pressure, and means including a sensitive element for controlling the separation of the nozzle and surface and producing variations in nozzle pressure, the combination of a control pressure relay valve for amplifying the nozzle pressure, said relay comprising a fluid pressure responsive element capable under steady state conditions of positioning a relay valve in accordance with the nozzle pressure, a retarded transfer means connecting the fluid pressure element with the nozzle pressure, a second fluid pressure responsive element actuating the relay valve in the same direction as the first fluid pressure responsive element and responsive to the difference between the nozzle pressure and the pressure in the first fluid pressure responsive element, and force transmitting connections from the fluid pressure elements to the relay valve.

6. In a fluid pressure control having a sensitive element responsive to a controlled quantity, control pressure responsive means for varying the controlled quantity, and means responsive to the sensitive element producing a pressure modulated in accordance with the sensitive element, the combination of a device for varying the control pressure including an element having a normal position and movable toward and away from extreme positions in accordance with changes in the modulated pressure, a spring resisting movement of the element, an adjustment for the tension of the spring, and a manually operable member slideable with reference to the adjustment for changing the adjustment of the spring by an amount sufficient to hold the element in one extreme position independent of the modulated pressure.

7. In a fluid pressure operated control mechanism of the type having a nozzle and cooperating surface controlling the nozzle pressure and means including a sensitive element for controlling the separation of the nozzle and surface and producing corresponding variations in nozzle pressure, the combination of a bleed type control pressure relay valve for amplifying the nozzle pressure, said relay comprising a fluid pressure responsive element capable under steady state conditions of positioning the relay valve in accordanace with the nozzle pressure, a retarded transfer means connecting the fluid pressure element with the nozzle pressure, means adjusting the delay of the retarded transfer means, a second fluid pressure responsive element actuating the relay valve in the same direction as the first fluid pressure responsive element and responsive to the difference between the nozzle pressure and the pressure in the first fluid pressure responsive element, and force transmitting connections from the fluid pressure elements to the relay valve.

8. In a fluid pressure operated control of the type having, a nozzle discharging against a cooperating surface, and means including a sensitive element responsive to a controlled quantity, for controlling the separation of the nozzle and surface and producing corresponding variations in nozzle pressure, the combination of a bleed type control pressure relay valve for amplifying the nozzle pressure, said relay comprising a sensitive fluid pressure responsive element connected through a retarded transfer means to the nozzle pressure positioning the relay valve in accordance with the steady state relative positions of the nozzle and surface, means varying the sensitivity of the sensitive pressure responsive element, and a less sensitive fluid pressure responsive element acting in the same direction as the first fluid pressure responsive element and directly responsive to the difference between the nozzle pressure and the pressure in the first element positioning the relay valve in accordance with the transient relative positions of the nozzle and surface, and force transmitting connections from the fluid pressure elements to the relay valve.

References Cited in the file of this patent

UNITED STATES PATENTS

| Number | Name | Date |
|---|---|---|
| 1,799,131 | Frymoyer | Mar. 31, 1931 |
| 1,897,135 | Mason | Feb. 14, 1933 |
| 2,240,243 | Mason | Apr. 29, 1941 |
| 2,240,244 | Cook | Apr. 29, 1941 |
| 2,299,884 | Edwards | Oct. 27, 1942 |
| 2,360,889 | Philbrick | Oct. 24, 1944 |
| 2,431,297 | Moore | Nov. 18, 1947 |
| 2,436,451 | Rosenberger | Feb. 24, 1948 |
| 2,461,026 | Bilyeu | Feb. 8, 1949 |
| 2,516,333 | Moore | July 25, 1950 |
| 2,635,618 | Moore | Apr. 21, 1953 |